United States Patent [19]

Hassenauer

[11] 3,735,711
[45] May 29, 1973

[54] ELASTOMERIC RAILWAY CAR SIDE BEARING

[75] Inventor: Robert L. Hassenauer, Wilmette, Ill.

[73] Assignee: Evans Products Company, Plymouth, Mich.

[22] Filed: July 16, 1971

[21] Appl. No.: 163,346

[52] U.S. Cl. ................105/199 CB, 267/3, 308/138
[51] Int. Cl. ..........B61f 5/14, F16c 17/04, F16f 1/36
[58] Field of Search ....................105/199 CB; 267/3, 267/4; 308/137, 138, 224

[56] References Cited

UNITED STATES PATENTS

| | | | |
|---|---|---|---|
| 2,636,451 | 4/1953 | Watter | 105/199 R |
| 3,045,998 | 7/1962 | Hirst | 267/3 |
| 3,439,631 | 4/1969 | Cope | 105/199 R |
| 3,518,948 | 7/1970 | King et al. | 308/138 X |
| 2,056,222 | 10/1936 | Wright | 308/138 |
| 2,788,250 | 4/1957 | Blattner | 308/138 |
| 2,301,372 | 11/1942 | Cottrell | 308/138 |
| 2,913,288 | 11/1959 | Blattner | 308/138 |
| 3,556,503 | 1/1971 | Van Moss, Jr. | 267/3 |
| 2,394,158 | 2/1946 | Ellis et al. | 308/138 |
| 2,926,973 | 3/1960 | Ellis | 308/138 |

Primary Examiner—Gerald M. Forlenza
Assistant Examiner—Howard Beltran
Attorney—Bedell & Burgess

[57] ABSTRACT

A railway car side bearing combining in a unitary structure a bottom member and a top member with an elastomeric pad compressed between them, and means definitely limiting the movements of the bottom and top members toward and away from each other irrespective of their association with the car truck and body. The unit is adapted to be mounted on a car truck bolster and to engage a car body bolster but is not to be attached to the body bolster.

8 Claims, 4 Drawing Figures

ELASTOMERIC RAILWAY CAR SIDE BEARING

Prior art side bearings have included opposing brackets or pads providing simple positive stops, with or without relatively movable frictionally engaging housing elements.

The general object of the invention is to attenuate or lessen rocking of the car body on the truck and to frictionally control swiveling of the truck relative to the body, offering increased frictional resistance to the swiveling action with any rocking of the body on the truck. More detailed objects are to facilitate handling and installation of the side bearing by its unitary construction while including an initial yielding resistance to relative movement of the truck and body.

Further objectives are to reduce wear on track rails, wheel flanges, truck and body center plates, friction wedges, side frame columns, wheel bearings and adaptors, and to produce easier riding for the car lading.

Figure 1:
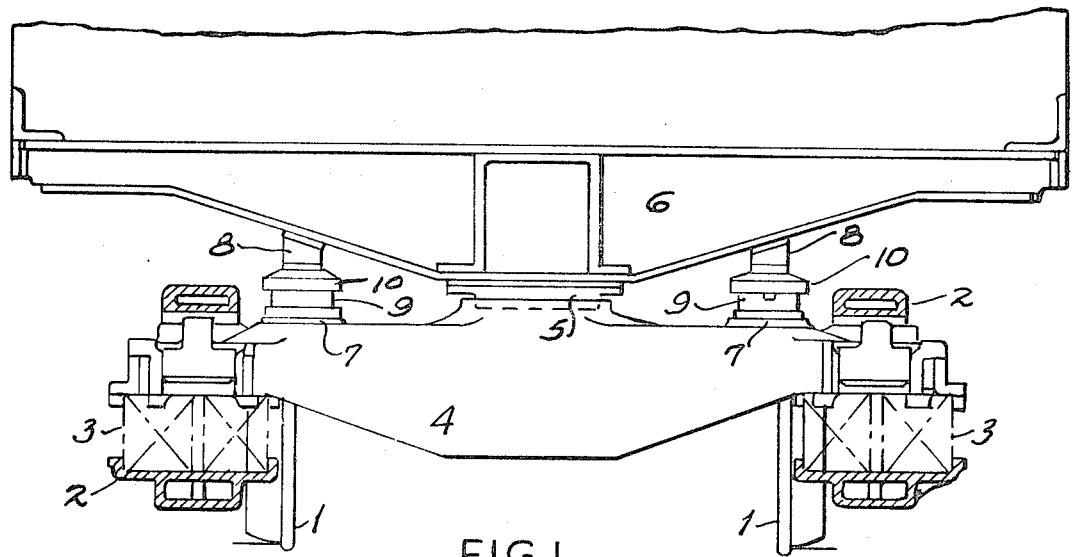
FIG. 1 is mainly a diagram of a transverse section through an ordinary freight car truck and body showing application of the improved side bearing.

The railway truck shown in FIG. 1 includes the usual wheels 1, frame 2, springs 3 and bolster 4 having a center plate 5 normally supporting a body bolster 6. The truck and body bolsters have opposed side bearing brackets 7 and 8 respectively.

Figure 2:
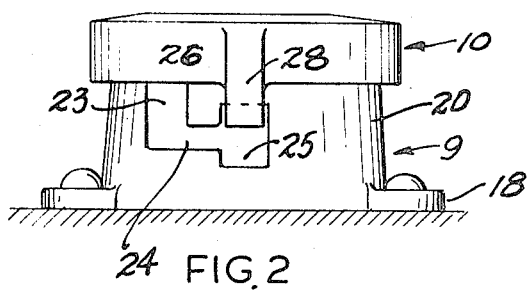
FIG. 2 is a side elevation of one of the side bearings.
Figure 3:
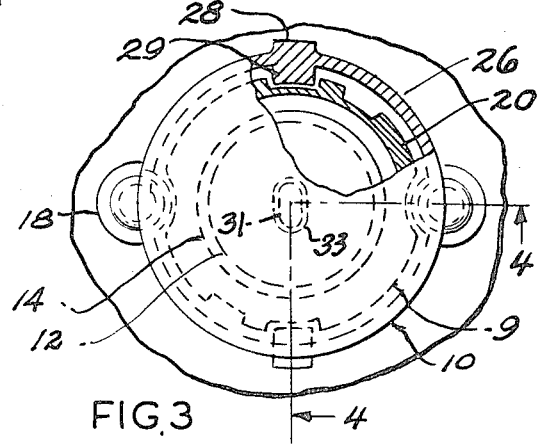
FIG. 3 is a top view of a side bearing with a portion sectioned horizontally on line 3—3 of FIG. 4.
Figure 4:
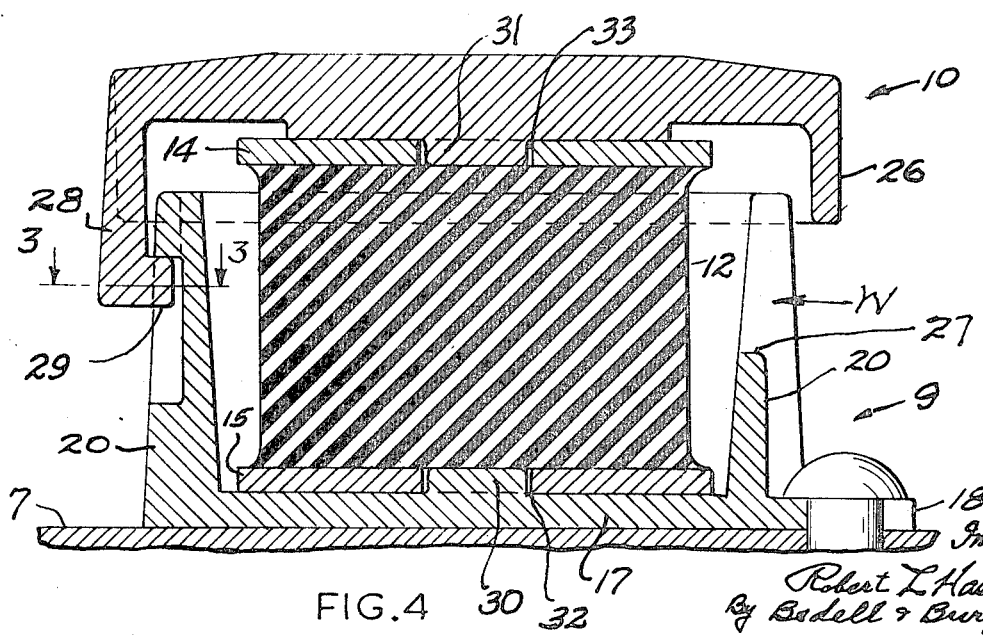
FIG. 4 is a vertical section on line 4—4 of FIG. 3 and drawn to a larger scale.

Each side bearing structure, detailed in FIGS. 2, 3 and 4, comprises a cup-shaped lower member 9, an inverted cup-shaped upper member 10 and an elastomeric pad 12 compressed between members 9 and 10, and having plates 14 and 15 bonded to its top and bottom faces. Lower member 9 includes a base 17 with extended flanges 18 by which it is bolted or riveted to the truck bolster. A circular upstanding side wall 20 on member 9 has diametrically opposite L-shaped slots each including a vertical portion 23, opening upwardly through the rim of the member, and a horizontal portion 24 spaced below the rim and leading from portion 23 and terminating in a vertical recess 25 with blind ends.

Upper member 10 has a circular depending side wall 26 with diametrically opposite fingers 28 depending therefrom, each terminating in an inturned ear 29 receivable in the L-shaped slot in wall 20.

Wall 20 is reduced in height intermediate slots 23, 24, 25 as shown at 27 to form windows W for clearing the heads of the retaining elements and to facilitate inspection of pad 12.

In assembly, pad 12 is placed within lower member 9; then upper member 10 is placed on top of the pad with fingers 28 aligned with slot portions 23. Downward pressure on the cap compresses the pad until ears 29 are at the level of slot portions 24; then members 9 and 10 are rotated relative to each other until ears 29 are received within blind recesses 25, whereupon the downward pressure is released and the ears shift upwardly in recesses 25 and positively hold the members against relative angular movement. Members 9 and 10 do not have frictional engagement with each other resisting their relative vertical movements. Such movement is controlled solely by compression of pad 12.

At the beginning of this assembly, oval bosses 30, 31 on the respective horizontal walls of members 9 and 10 are disposed transversely of similarly shaped apertures 32, 33 in face plates 14, 15. When the members are rotated 90° to align ears 29 with recesses 25, bosses 30, 31 pop into apertures 32, 33 respectively and the members cannot be rotated in the reverse direction by friction between the cap and pad to align ears 29 with slots 23 and permit separation of members 9 and 10.

The side bearing assembly may be handled as a unit for shipment and for application to a truck. If the bearing unit is to be applied to an assembled truck and body, the car body may be jacked up a few inches to accommodate insertion of the side bearing but it will not be necessary to withdraw the truck from beneath the body nor to apply or remove any parts to or from the body bolster.

When the side bearing base and cap parts are interengaged as shown in FIGS. 2 and 4, the pad is subject to an initial compression of about one-eighth inch from its free height. This holds the parts assembled. When the unit is installed between truck and body bolster members (FIG. 1) there is a further normal compression of the pad of about one-half inch. The pad at one side of the truck is subject to a further compression of an additional one-half inch when under load which will cause the corresponding cap top wall 26 to engage the rim of the base side wall 20. The pad at the opposite side of the truck will expand an equal amount.

The bearing unit attenuates or reduces rocking action of the body bolster relative to the truck bolster because the pad is under compression at all times irrespective of whether the body bolster is parallel with the truck bolster or is inclined vertically to the truck bolster, but the unit does not control or eliminate desirable rocking action of the body because of the action of springs 3 supporting the truck bolster on the truck frame.

The device controls or dampens the swiveling action of the truck to eliminate undesirable truck oscillating frequencies and displacements that cause truck components and truck-to-car body interface members to wear excessively during medium and high speed train action. This damping action is accomplished by the bearing producing a horizontal friction force between wear plates 8 or car body bolster 6 and the side bearing caps 10.

The details of the structure and the dimensions indicated may be modified substantially for cars of different capacities without departing from the spirit of the invention as expressed in the appended claims.

I claim:

1. A railway car side bearing structure comprising a lower cup-shaped member for mounting on a truck bolster and an upper inverted cup-shaped member for engagement with a car body bolster, said members being circular in cross section and telescopingly assembled for relative vertical movement and provided with interengagable elements to positively limit their relative rotary movement and vertical movement, and an elastomeric pad spaced from the sides of said members to accommodate lateral deformation of said pad initially compressed vertically between said members to thrust said members apart, said pad being further compressible under load.

2. A railway car side bearing structure as described in claim 1 which includes means positively holding the elastomeric pad against rotation about its vertical axis relative to the cup-shaped members.

3. A railway car side bearing structure as described in claim 1 in which metal wear plates are bonded to the lower and upper faces of the elastomeric pad and are interlocked against relative rotation about their common axis relative to the lower and upper cup-shaped members respectively.

4. A railway car side bearing structure as described in claim 1 comprising a lower cup-shaped member for mounting on a truck bolster and an upper inverted cup-shaped member for horizontal sliding engagement with a car body bolster, said members being telescopingly assembled for relative vertical movement, in which the upright side of the lower member has an L-shaped recess extending downwardly and then laterally from the upper edge of the member, and the upper member has a depending finger exteriorly of said upright side and terminating in a radially extending ear received in said recess and holding the members against separation and against rotation about their vertical axis.

5. A railway car side bearing comprising a base member and a cap member, an elastomeric pad compressed between said members, said base member having an upstanding circular wall surrounding said pad and spaced therefrom, said cap member having a depending circular wall surrounding said upstanding wall and spaced therefrom, said upstanding wall having a rim forming external downwardly facing horizontal shoulders, said depending wall having spaced inturned horizontal ears, normally engaging said shoulder, there being vertical slots in said shoulder corresponding in width to said ears and accommodating movement of said ears therethrough, when aligned therewith, for assembly and disassembly of said members.

6. In combination in a railway truck and body, a center bearing providing support for the car body on the truck, and yielding side bearings including vertical yielding elastomeric pad spaced transversely of the truck from the center bearing and having a predetermined loading and affording limited constant resistance to tilting of the body on the center bearing irrespective of the load on the side bearing.

7. The combination of a railway truck and body as described in claim 6 in which the increased load on one of the side bearings produces increased resistance to swiveling of the truck about the center bearing on the truck bolster and center plate on the body.

8. A railway car side bearing unit comprising a lower cup-shaped member for mounting on a truck bolster and an upper inverted cup-shaped member for horizontal sliding engagement with a car body bolster, said members being telescopingly assembled for relative vertical movement, in which one of said members has an L-shaped slot in its side wall opening inwardly from the edge thereof and the other member has a finger projecting from its wall through the first-mentioned member and terminating in a horizontal lug entering said slot and positively preventing rotation of said members about their common vertical axis.

* * * * *